United States Patent
Hao et al.

(10) Patent No.: US 10,715,599 B2
(45) Date of Patent: Jul. 14, 2020

(54) INTERNET OF THINGS (IOT) PLATFORM AND APPLICATION FRAMEWORK

(71) Applicant: Verizon Patent and Licensing Inc., Arlington, VA (US)

(72) Inventors: Jianxiu Hao, Acton, MA (US); Dongchen Wang, Concord, MA (US); Michael P. Ruffini, Methuen, MA (US); Thierry R. Sender, New York, NY (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 683 days.

(21) Appl. No.: 14/953,895

(22) Filed: Nov. 30, 2015

(65) Prior Publication Data
US 2017/0155703 A1 Jun. 1, 2017

(51) Int. Cl.
*H04L 29/08* (2006.01)
*H04W 84/12* (2009.01)
*H04W 4/70* (2018.01)
*H04W 84/04* (2009.01)

(52) U.S. Cl.
CPC ............... *H04L 67/12* (2013.01); *H04W 4/70* (2018.02); *H04W 84/04* (2013.01); *H04W 84/12* (2013.01)

(58) Field of Classification Search
CPC ........... H04L 12/2809; H04L 12/2818; H04W 4/203; H04W 4/005
See application file for complete search history.

(56) References Cited

U.S. PATENT DOCUMENTS

| 7,315,886 | B1* | 1/2008 | Meenan | H04L 63/126 709/212 |
| 9,407,624 | B1* | 8/2016 | Myers | H04L 63/08 |
| 2002/0186660 | A1* | 12/2002 | Bahadiroglu | H04L 29/06 370/248 |
| 2005/0201301 | A1* | 9/2005 | Bridgelall | H04W 4/203 370/254 |
| 2007/0153802 | A1* | 7/2007 | Anke | H04L 47/10 370/395.42 |

(Continued)

OTHER PUBLICATIONS

Gubbi et al. "Internet of Things (IoT): A Vision, Architectural Elements, and Future Directions". 2013. (Year: 2013).*

(Continued)

*Primary Examiner* — Tonia L Dollinger
*Assistant Examiner* — Jonathan A Sparks

(57) ABSTRACT

A status of an Internet of Things (IoT) device included in a local area cloud is identified. The local area cloud includes IoT devices that are connected in a wireless local area network (WLAN), and one IoT device functions as a leader of the local area cloud. A cloud server associated with the IoT device is identified and information identifying the status is forwarded to the cloud server via a wireless wide area network (WWAN). The cloud server selects an action to be performed by the IoT device and forwards data identifying the action. The leader receives and distributes information identifying the action to the IoT device via the local area cloud. The action may include actions by multiple IoT devices in the local area cloud or IoT devices included in multiple local area clouds. A user may input data to control the cloud server.

20 Claims, 7 Drawing Sheets

(56) References Cited

U.S. PATENT DOCUMENTS

| | | | | |
|---|---|---|---|---|
| 2012/0323686 A1* | 12/2012 | Burger | ............... | G06F 21/316 |
| | | | | 705/14.55 |
| 2013/0054863 A1* | 2/2013 | Imes | ............... | H04L 12/2827 |
| | | | | 710/304 |
| 2018/0270635 A1* | 9/2018 | Guo | ............... | H04W 72/04 |
| 2019/0320395 A1* | 10/2019 | Wong | ............... | H04W 52/265 |

OTHER PUBLICATIONS

Hata et al. "Mobile Location using Signal Strength Measurements in a Cellular System". 1980. (Year: 1980).*

Tillapart et al. "An Approach to Hybrid Clustering and Routing in Wireless Sensor Networks". 2004. pp. 1-4. (Year: 2004).*

Hussain et al. "Cluster Head Election Schemes for WSN and MANET: A Survey". 2013. World Applied Sciences Journal 23. Whole Document. (Year: 2013).*

* cited by examiner

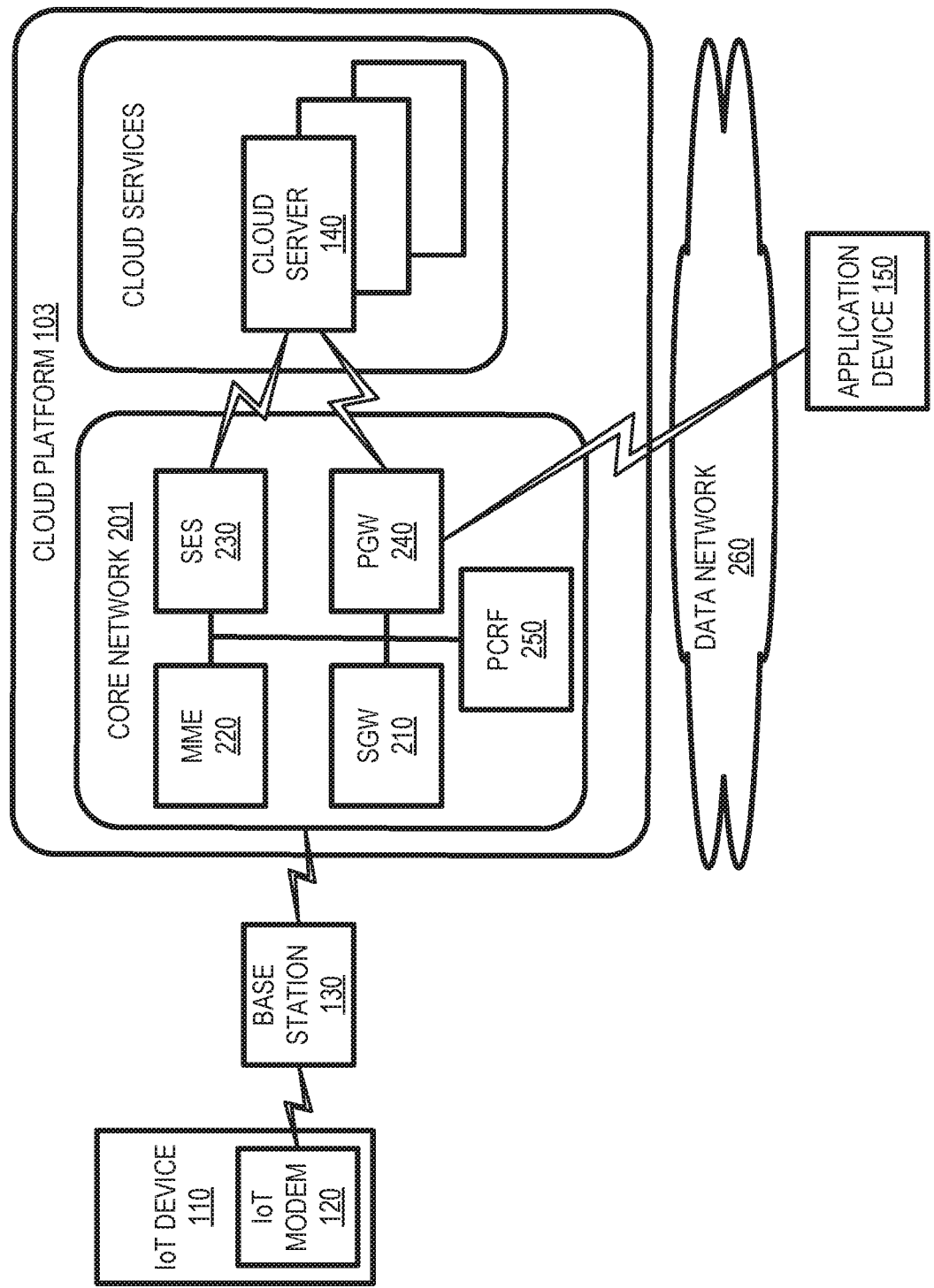

INTERNET OF THINGS (IOT) PLATFORM AND APPLICATION FRAMEWORK

BACKGROUND

Internet services generally relate to providing communication, information, and/or entertainment by exchanging data between devices and various computing clouds. Internet connections enable digital content consumptions and provide various service enhancements that enable users to perform tasks in an efficient manner. Internet connections typically are based on relationships in which servers associated with service providers and/or content providers forward data to browsers or other applications associated with users. However, after Internet connectivity reached a certain scale, the server and user relationship become blurred so that users started providing the data used by the services. For example, information related to users' purchases and reviews provided by the users may be collected by a product recommendation engine to generate purchase recommendations. In another example, information regarding users' movements may be collected and used by a mapping service to generate recommended travel directions to the users.

BRIEF DESCRIPTION OF THE DRAWINGS

FIG. 2 shows exemplary components of a core network that may be included in the environment shown in FIGS. 1A-1C;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The Internet of Things (IoT) is the network of devices, or "things," embedded with electronics, software, sensors, and network connectivity, to enable these devices to collect and exchange data. The IoT allows devices to be monitored and controlled remotely across existing network infrastructure to enable more direct integration between the physical world and computer-based systems. Each IoT device is uniquely identifiable through its embedded computing system and is able to interoperate within the existing Internet infrastructure.

IoT services may be fragmented in that the IoT services may operate as either data collecting tools connected to the clouds or may be deployed as individual tools connected through applications. Consequently, IoT device may be limited tools for data collections, such as video cameras and sensors or controlling tools through a mobile application for controlling remote door locks, lighting or garage door openers with minimal intelligence. IoT devices are evolving to become more fully connected to improve services. For example, IoT devices may be connected to perform sequential actions in which an IoT device performs some action in response to actions by one or more other IoT devices. In this example, an IoT device may notify another IoT device when a certain action is performed and/or certain data is collected. For instance, when an IoT device detects a user (e.g., the user activates a garage door opener), another IoT device may perform actions to automatically activate lights, adjust interior climate controls, etc. In another example, an IoT device may be connected to perform tasks in parallel, such as to capture video footages or images of an event at different angles and/or positions. In these examples, the IoT device may be linked together with other IoT devices through the central clouds that exchange content and further provide an intelligence to coordinate the IoT devices.

Figure 1A:
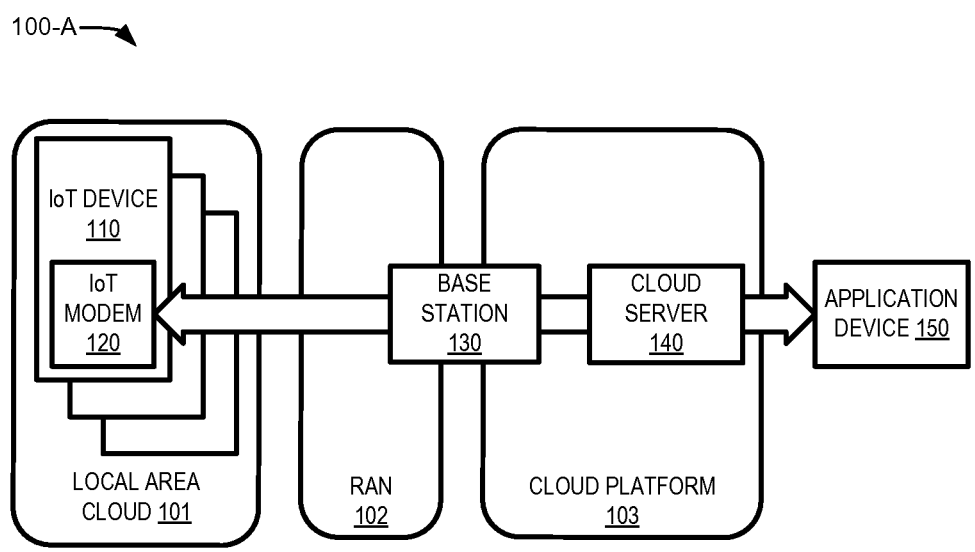
FIGS. 1A-1C show an exemplary environment in which systems and/or methods described herein for controlling Internet of Things (IoT) devices may be implemented.
Figure 1B:
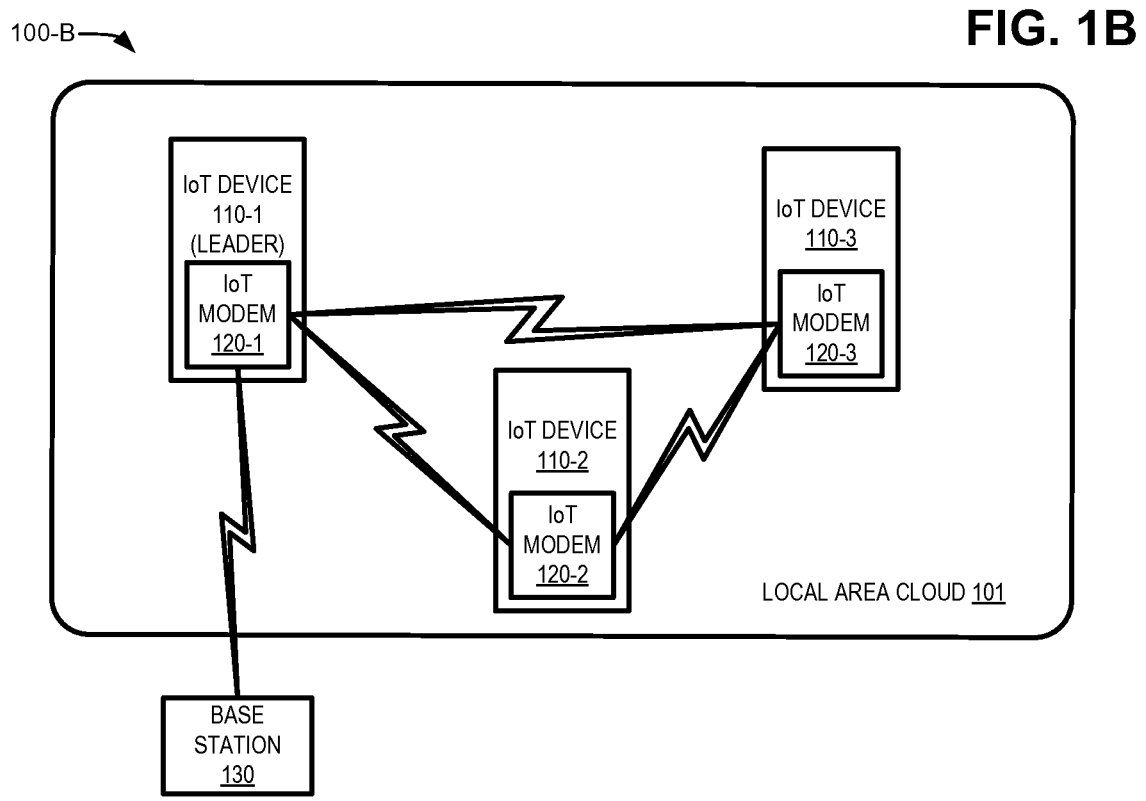
Figure 1C:
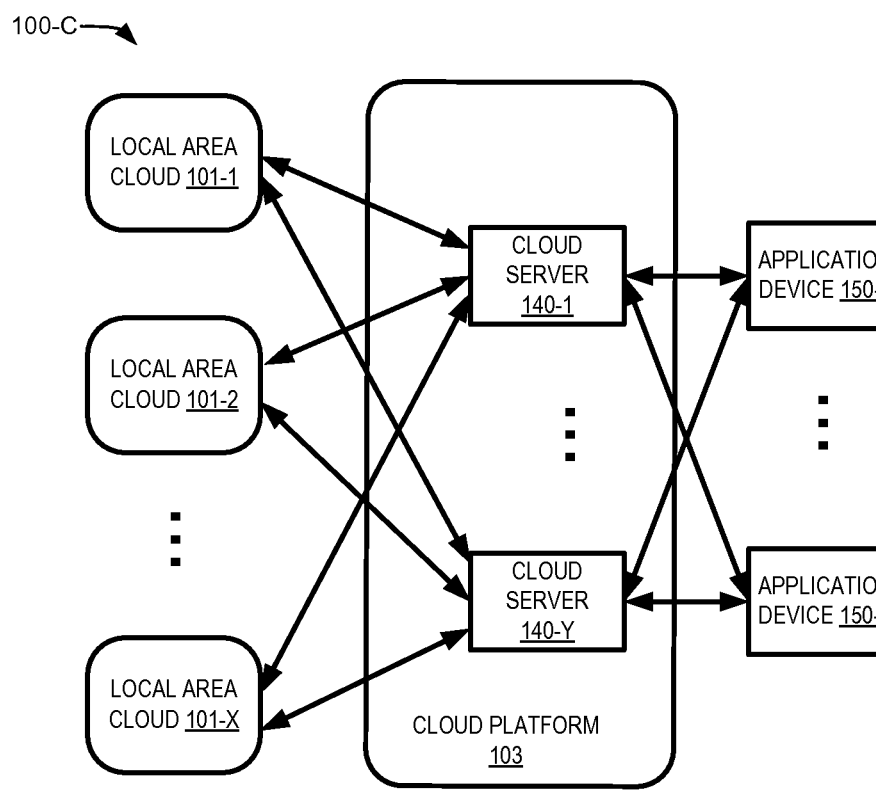

FIGS. 1A-1C show aspects of an exemplary environment 100 (shown in FIG. 1A-1C as environments 100-A through 100-C) for providing an IoT that enables improved services and capabilities. As shown in FIG. 1A, environment 100-A may include multiple IoT devices 110 that include and/or are coupled to IoT modulators-demodulators (modems) 120 in a local area cloud 101; and a base station 130 that is coupled to the IoT devices 110 via a radio access network (RAN) 102 and that provides access to a cloud platform 103 that couples IoT device 110 to a cloud server 140 and an application device 150.

As used herein, the term "user" is intended to be broadly interpreted to include an IoT device 110 or a person using IoT device 110. Also, the terms "user," "owner," "consumer," "subscriber," and/or "customer" are intended to be used interchangeably.

IoT devices 110 may include, for example, a wide variety of devices that may be connected in an IoT and may include objects embedded with electronics, software, and sensors which enables these objects to collect and exchange data. For example, IoT devices 110 may include various electronic, computing, and/or communications device that are connected within local area cloud 101. Local area cloud 101 may represent a wireless local area network (WLAN) at a geographic location or building (e.g., a home, a school, a business), and IoT devices 110 within local area cloud 101 may represent a group of devices that are connected together at the location via the WLAN. For instance, IoT devices 110 may include a fitness tracker, a smart watch, smart glasses, or another peripheral and/or wearable device that may be used in connection with a user device (e.g., a smart phone).

In certain implementations, environment 100 may include a first category of IoT devices 110 (e.g., "sensor" IoT devices 110) that collect data, and a second category of IoT devices 110 (e.g., "actuator" IoT devices 110) that perform actions based on the data collected by the first category of IoT devices 110. An actuator IoT device 110 converts a command from cloud server 140 into a physical action that is outside of the information processing realm. For example, certain actuator IoT device 110 may activate a light, engage a door lock, regulate a medical device, turn a steering wheel of a vehicle, adjust a thermostat, etc. In one example, sensor IoT devices 110, such as motion sensors, door openers, environmental sensors, etc. may detect the presence of a user in a building, and actuator IoT device 110 may be directed to perform certain functions, such as opening locks, activating lights, modifying environment conditions, activating computing devices, etc., based on the detected presence of the user. In another example, a sensor IoT device 110, such as a heart rate detector, may collect and report data related to the user's health, and an actuator IoT device 110 may provide some type of action, such as providing medicine when certain conditions are detected or notifying a health official when other conditions are detected.

When forming local area cloud 101, a leader IoT device 110 may determine whether another IoT device 110 requesting admissions to local area network is a sensor IoT device 110 or an actuator IoT device. In some situations, local area cloud 101 may link similar categories of IoT devices 110. For example, one local area cloud 101 in a geographic location may link sensor IoT devices 110, and a second, different local area cloud 101 in the geographic location may link actuator IoT devices 110. When communicating with base station 130, leader IoT device 110 may use different types of communications when local area cloud 101 includes actuator IoT devices 110 in comparison to local area cloud 101 that includes only sensor IoT devices 110. For example, when an associated local area cloud 101 includes actuator IoT devices 110, leader IoT device 110 may communicate with base station 130 and/or other IoT devices 110 using more secure, more reliable, higher priority, faster, higher bandwidth, communications versus communications used between base station 130 and another local area cloud 101 that include sensor IoT devices 110. In this way, actuator IoT devices 110 are more likely to receive instructions from cloud server 140, receive the instructions more quickly, and it is relatively more difficult for an unauthorized third-party to access and control actuator IoT devices 110.

In some examples, the same IoT device 110 may operate to provide sensor data (e.g., operate as a sensor IoT device 110) in certain situations and may perform actions (e.g., operate as an actuator IoT device 110) in other situations. For example, an IoT device 110 related to engaging a door lock may forward sensor data when used (e.g., locked or unlocked) by a user, and may also receive instructions from cloud server 140 to perform a function (e.g., to selectively become locked or unlocked) when other sensor data is received (e.g., sensor data indicating that the user activated another IoT device 110 such as a garage door opener).

In one implementation, an IoT device 110 may include communications capabilities to join local area cloud 101 and to communicate with IoT modems 120 connected to other IoT devices 110. For example, an IoT device 110 may include a wireless router or a computing device with short-range communications capabilities. Additionally or alternatively, an IoT device 110 may include longer range communications capabilities to access a wireless wide area network (WWAN) or other mobile data and communications networks, such as third generation (3G) and fourth generation (4G) (e.g., long-term evolution (LTE)) wireless access technologies to communicate with cloud platform 103. For example, IoT device 110 may include a smart phone, or other device (e.g., a computer, set-top box, a gaming machine, tablet), etc. with extended-range communications capabilities. In another example, IoT devices 110 may communicate within local area cloud 101 or with base station 130 using machine-to-machine (M2M) communications. M2M communications automate a variety of data gathering operations and/or provide automatic data communications in support of a variety of other automated applications.

As shown in FIG. 1A, IoT devices 110 may be connected via local area cloud 101 to coordinate functions. For instance, IoT devices 110 at a common geographic location may be connected in a single local area cloud 101. IoT devices 110 in local area cloud 101 may belong to (or otherwise be associated with) different owners (or users), and the IoT devices 110 may connect to different backend cloud networks associated with the respective owners to perform certain functions and/or to exchange data with other IoT devices 110 associated with other owners. In this way, an IoT device 110 may connect (e.g., via IoT modems 120) with other IoT devices 110 in local area cloud 101 to perform certain tasks at a geographic location, and may also connect to other remote IoT devices 110 (e.g., IoT devices 110 in other local area clouds 101 at) through a backend cloud server to perform other tasks at other geographic locations.

IoT modems 120 may interface with IoT devices 110 to provide communications capabilities. For example, IoT modems 120 may couple to IoT devices 110 that does not include communications capabilities to access local area cloud 101. In one implementation, IoT modems 120 may connect to IoT devices 110 and/or other IoT modems 120 via a local (e.g., short-range) communications standard. For example, IoT modems 120 may wirelessly communicate over short distances (e.g., within a few meters). IoT modems 120 may communicate using, for example, radio signals (e.g., Bluetooth® as described in the Institute of Electrical and Electronics Engineers (IEEE) 802.15.1 standard or Wi-Fi as described in the IEEE 802.11 protocol) and/or infrared signals (e.g., as described in Infrared Data Association (IrDA) standards). For example, IoT modems 120 may pair (e.g., establish a wireless connection) to exchange sensor, control, or application data when in proximity of one another.

In certain implementations, IoT modems 120 may be included with or are parts of IoT device 110. For example, certain types of IoT devices 110, such as smart phones, may include a transceiver that may be adapted to perform as IoT modem 120 to provide both local and wide area communications.

IoT modem 120 may enable communications between one of the IoT devices 110 in local cloud 101 and base station 130. For example, an IoT device 110 in local cloud 101 may communicate with base station 130 to access cloud platform 103. In one implementation, IoT modem 120 may provide a wireless control channel that provides small control payloads (e.g., less than 256 bytes). The small control payloads may be suitable for most of the IoT device communications. For example, IoT modem 120 may forward small-sized (e.g., a payload data of 256 bytes or less) communications or messages, such as a PUSH message forwarding sensor and/or status readings, to cloud platform 103. Additionally or alternatively, IoT modem 120 may receive relatively small-sized messages such as a PING or other command message, from cloud platform 103. Because IoT modem 120 may exchange relatively small-sized messages with other IoT modems 120 or with base station 130, IoT modem 120 may operate in a relatively power efficient manner such that IoT modem 120 may be active (e.g., be available to send and/or receive messages) for several years when powered by a small power source, such as a watch battery.

As shown in FIG. 1A, IoT device 110 may communicate (e.g., using IoT modem 120) with base station 130 via RAN 102. RAN 102 may be associated with a long-term evolution (LTE) network and/or another type of wireless communications network and a core network, such as an evolved packet core (EPC) that operates based on a third generation partnership project (3GPP) wireless communication standard that enables IoT device 110 to communicate with cloud platform 103.

As further shown in FIG. 1A, RAN 102 may include one or more base stations 130 through which IoT device 110 may access cloud platform 103. Base station 130 may include one or more network devices (e.g., a wireless hotspot device such as a wireless modem) that receive, process, and/or transmit traffic such as sensor data, instructions, etc., associated with IoT devices 110. In another example, base station 130 may be an enhanced node B (eNB) device and may be part of the LTE or other wireless data and communications network. Base station 130 may allow traffic to be exchanged between IoT devices 110 and cloud server 140 and/or application device 150 via cloud platform 103. In one implementation, base station 130 may be associated with RAN 102 and may send traffic to and/or receive traffic from IoT device 110 via a wireless interface.

IoT device 110 may receive instructions from cloud server 140 and/or application device 150. Application device 150 may correspond, for example, to a user device, such as computer, smart phone, set-top box (STB), gaming machine, etc., associated with an owner of the IoT device 110. For example, cloud server 140 may include a cloud profile (e.g., a policy engine and a configuration file) associated with an IoT device 110, and application device 150 may include a client program associated with the IoT device 110. For example, IoT device 110 may perform various functions based on the cloud profile within cloud server 140, and an associated owner may use application device 150 to configure and control IoT device 110 using the client program. For example, the owner may submit an input to application device 150, and the input may modify a configuration file stored by cloud server 140. The policy engine associated with cloud server 140 may select an action for IoT device 110 based on the modified configuration file.

For example, the cloud profile within cloud server 140 may be associated with data analysis. Cloud server 140 may collect data from associated IoT devices 110 and perform data analysis on collected data received from IoT devices 110. For example, cloud server 140 may determine the status of IoT devices 110, report the status of the IoT devices 110 to other devices and forward instructions to the IoT devices 110. In one implementation, cloud server 140 may perform real-time analysis to identify status changes and to generate appropriate recommendations for actions by IoT devices 110 based on the identified status changes. For example, cloud server 140 may identify usage patterns related to IoT device 110, and cloud server 140 may identify any unusual usage patterns and select an appropriate action in response to the identified unusual usage patterns.

In one example, cloud server 140 may use fast algorithms to perform for data analytics for the cloud profiles for IoT devices 110. For example, cloud server 140 may use an a priori algorithm in which frequently appearing individual items, in a status and action database maintained by cloud server 140, are identified. Cloud server 140 may use the identified frequently occurring item sets to determine association rules which highlight general trends in the database. For example, cloud server 140 may use trends in sensor readings reported by IoT device 110 to predict trends in future sensor readings and use these predicted trends to identify appropriate actions.

In certain instances, cloud server 140 may interface with other data sources (e.g., servers that differ from IoT device 110) to collect additional information that may be used to determine appropriate actions for IoT device 110. For example, if IoT device 110 collects data regarding environmental conditionals and modifies environmental controls based on the detected environmental conditionals, cloud server 140 may access weather services, traffic services and public work services to acquire additional data regarding environmental conditionals (e.g., attributes of an approaching storm that is not detected by IoT device 110).

Cloud server 140 may further determine configuration parameters related to IoT devices 110. For example, configuration parameters may be part of a policy engine, stored by cloud server 140, which controls how IoT devices 110 connect to each other. For example, cloud server 140 may store data indicating whether a configuration for IoT device 110 is "public," "friendly," or "private." When configured as a "public" device, IoT device 110 may initiate local area cloud 101 that accepts any other IoT devices 110. When configured as a "friendly" device, IoT device 110 may initiate local area cloud 101 that admits only certain identified (e.g., known) IoT devices 110, and when configured as a "private" device, IoT device 110 may initiate local area cloud 101 that accepts other IoT devices 110 associated with the same owner.

Cloud server 140 may further function as a control center to direct IoT device 110 to perform certain actions. For example, IoT device 110 may connect to other IoT devices 110 and operate based on configuration parameters stored in a local policy engine, and cloud server 140 may update the parameters and/or direct IoT device 110 to perform an action. For example, if cloud server 140 determines that more than a threshold number of other IoT devices 110 are connected in a WiFi-based local area cloud 101 associated with an IoT device 110, cloud server 140 may direct IoT device 110 to shutdown the WiFi access and/or change a configuration parameter (e.g., change the configuration for IoT device 110 from "public" to "private").

In certain implementations, cloud server 140 may separately interface and control sensors IoT device 110 and actuator IoT devices 110. For example, cloud server 140 may direct sensor IoT devices 110 to collect and report data and may cause other actuator IoT devices 110 to perform one or more actions based on the collected sensor data. In certain situations, second, different local area cloud 101 in the geographic location may link actuator IoT devices 110.

When communicating with local area cloud 101 via cloud platform 103, cloud server 140 may use a first type of communications when local area cloud 101 includes actuator IoT devices 110 and second, different type of communication when local area cloud 101 includes only sensor IoT devices 110. For example, when an associated local area cloud 101 includes actuator IoT devices 110, cloud platform 103 may direct communications using more secure, more reliable, higher priority, faster, higher bandwidth, paths and/or may direct the communications along certain (e.g., trusted) nodes. In this way, actuator IoT devices 110 are more likely to receive instructions from cloud server 140, receive the instructions more quickly, and it is relatively more difficult for an unauthorized third-party to access and control actuator IoT devices 110.

In another example, cloud platform 103 may allocate different types and/or amounts of computing resources when determining paths for actuator IoT devices 110 versus sensor IoT devices 110. For example, cloud platform 103 may choose to allocate more powerful processing capability for actuator IoT devices 110 to ensure a swifter response, which may include allocating more powerful processors, more memory, and/or using residential servicing tasks. Allocating more resources to handling requests to route messages for actuator IoT device 110 may minimize and/or eliminate loading time for the requests.

Cloud server 140 may also perform security determinations related to IoT device 110. For example, when a first IoT device 110 attempts to join local area cloud 101 associated with (e.g., provided by) a second IoT device 110, cloud server 140 may determine whether to classify the first IoT device 110 as a friend of the second IoT device 110.

An example of the operation of cloud server 140 is now described with respect to a local area cloud 101 located within a museum. Local area cloud 101 may include IoT devices 110 (e.g., WiFi media streaming devices) that provide information regarding exhibits presented in different sections of the museum. Visitors to the museum may have their own IoT devices 110 (e.g., wearable media receivers, smart phones, etc.). When a visitor enters a section of the museum, the visitor's IoT devices 110 may connect to a local area cloud 101 provided by an associated museum IoT device 110. The museum's IoT device 110 may report information regarding the connection to cloud server 140, and cloud server 140 may determine instructions and data to be forwarded to the museum's IoT device 110 and/or the visitors IoT devices 110. For example, when a visitor's IoT device 110 (e.g., a media receiver) connects to a museum IoT device 110 presenting information regarding a particular exhibit, cloud server 140 may forward additional information regarding the exhibit to another visitor's IoT device 110 (e.g., a media receiver). In another example, cloud server 140 may determine a movement pattern associated with the visitor and, based on the movement pattern, may forward information to the visitor's IoT device 110 regarding other exhibits in other sections of the museum, warn the visitor's IoT device 110 regarding crowded areas of the museum, etc. In yet another example, if a visitor's IoT device 110 connects to multiple museum IoT devices 110, cloud server 140 may instruct certain museum IoT devices 110 to connect to the visitor's IoT device 110 (e.g., based on the visitor's movement pattern) and/or instruct other museum IoT devices 110 to deny connections requests from the visitor's IoT device 110, etc.

As another example, the operation of cloud server 140 is described with respect to a mapping service for guiding a group of moving vehicles. For example, IoT devices 110 associated with the vehicles may forward information regarding the vehicles' locations, movements (e.g., velocity, travelling direction, changes in velocity, etc.); operation (e.g., whether wipers, lights, brakes, etc. are active), and environment conditions (e.g., temperature, ambient light levels, etc.). Cloud server 140 may determine an optimal route (e.g., a route resulting in a minimum travel time, avoid traffic, avoiding an identified danger, etc.) and may forward travel instructions to an IoT device 110 based on the optimal route. Cloud server 140 may further identify inclement environmental conditions, such as a rain storm based on the collected information and may modify the travel instructions to avoid the identified conditions. When identifying the inclement environmental conditions, cloud server 140 may interface with another data source, such as a weather service server. Cloud server 140 may further instruct a group of IoT devices 110 (IoT devices 110 associated with a group of vehicles traveling in a common direction) to form a local area cloud 101 (e.g., to direct the vehicles to follow a common route).

As previously described, application device 150 may include a client program associated with the IoT device 110, and a user associated with an IoT device 110 may use the client program to control the operation of control cloud server 140. For example, the user may direct cloud server 140 to cause IoT device 110 to connect with certain other IoT devices 110 in a local area cloud 101. In another example, the client program in application device 150 may configure cloud server 140 to instruct IoT devices 110 to perform certain functions and/or operate in a certain way. In still another example, the client program in application device 150 may identify available actions (or other options) associated with IoT device 110, and application device 150 may prompt the user to submit an input selecting one of the available actions. For instance, cloud server 140 may determine available actions for IoT device 110 based on actions by other IoT devices 110, sensor readings collected by IoT device 110, etc., and may forward, to application device 150, data identifying the available actions.

In certain implementations, application device 150 may receive a user input to determine what level of security, what type of communication paths, etc. to be used by cloud server 140 for sensor IoT devices 110 and for actuator IoT devices 110. For example, cloud server 140 may, by default, use a more secure protocol (e.g., encrypting data using longer length encryption keys) and a high priority path and may direct cloud server 140 to receive sensor data from actuator IoT devices 110 using a less secure protocol (e.g., encrypting data using shorter length encryption keys) and a lower priority path. Application device 150 may direct cloud server 140 to use the more secure protocol and/or the higher priority path when communicating with certain types of sensor IoT devices 110. For example, cloud server 140 to use the more secure protocol and/or the higher priority path when communicating with sensor IoT devices 110 that collect medical data regarding a patient. In another example, cloud server 140 may use the more secure protocol and/or higher priority path when interfacing with actuator IoT devices 110 that are performing time-sensitive functions (e.g., actuator IoT devices 110 that modify operation of a vehicle when dangerous conditions are detected) and may use the less secure protocol and/or the lower priority path when interfacing with actuator IoT devices 110 performing less time-sensitive functions, such as activating decorative lights.

Returning to the IoT devices 110 for guiding a user through a museum, the user may provide an input to application device 150 selecting a topic of interest, and cloud server 140 may direct the user through the museum based on the selected topic of interest. In the other example of a mapping service in a vehicle, the user may submit an input to application device 150 identifying one or more routing constraints (e.g., avoiding toll roads, a desired destination, etc.), and cloud server 140 may generate mapping instructions based on the routing constraints. In yet another example, the user may use application device 150 to forward instructions to IoT devices 110 associated with the user, such as to remotely control the operation of IoT devices 110 at the user's residence when the user is travelling (e.g., not present at the residence).

As shown in FIG. 1B, environment 100-B may include local area cloud 101 that connects multiple IoT devices 110 (shown in FIG. 1B as IoT device 110-1, 110-2, and 110-3) that include or are otherwise coupled to IoT modems 120 (shown in FIG. 1B as IoT modems 120-1, 120-2, and 120-3).

When IoT device 110 is activated, enters a new area, or leaves a local area cloud 101, IoT device 110 may search for local area cloud 101 to join. For example, IoT device 110 may scan for available local area cloud 101 or other local network. If no local area cloud 101 is present, IoT device 110 may initiate local area cloud 101 as a "leader." Otherwise, IoT device 110 (referred to as requesting IoT device 110-2) may detect an existing local area cloud 101 and may request admission to the detected local area cloud 101. For example, IoT device 110 forward a connection request to another IoT device 110 (referred to as "leader IoT device 110-1) functioning as the leader of the detected local area cloud 101.

Leader IoT device 110-1 may provide basic group services, such as local network setup (e.g., based on WiFi or Bluetooth® services), and security verification based on defined rules. After an identity of requesting IoT device 110-2 is verified by leader IoT device 110-1, the requesting IoT device 110-2 may be allowed to join local area cloud 101. For example, leader IoT device 110-1 may forward credential that enable requesting IoT device 110-2 to access a WLAN associated with local area cloud 101.

In one instance, requesting IoT device 110-2 may forward, to leader IoT device 110-1, a request to join local area cloud 101, and the request may include information identifying requesting IoT device 110-2. For example, the login request may include a mobile device number (MDN), a mobile subscriber identification number (MSIN), an international mobile subscriber identity (IMSI), a temporary mobile subscriber identity (TMSI), a media access control address (MAC address), an Internet protocol (IP) address, or other data that may be presented by requesting IoT device 110-2 when attempting to accessing local area cloud 101. In another example, the request may include an international mobile station equipment identity (IMEI) for mobile devices, a mobile equipment identifier (MEID), a universally unique identifier (UUID) for non-mobile devices such as devices that communicate using short range communications protocols, such as Wi-Fi or Bluetooth®. Leader IoT device 110-1 may extract the identifying data from the login request and may use the identifying data to determine whether to admit requesting IoT device 110-2 into local area cloud 101.

As previously described, leader IoT device 110-1 may verify whether another, requesting IoT device 110-2 is eligible to join local area cloud 101. For example, if admission to local area cloud 101 is limited to friend devices (e.g., known IoT devices 110), leader IoT device 110-1 may maintain a list of known IoT devices 110 (e.g., friend devices) and may determine whether a requesting IoT device 110-2 is identified on the list. In another example, leader IoT device 110-1 may maintain a list of known users (e.g., friends), and leader IoT device 110-1 may identify a user associated with requesting IoT device 110 and determine whether the identified user is included in the list of friends. For example, a group of contacts may be associated with leader IoT device 110-1, and leader IoT device 110-1 may determine whether the requesting IoT device 110 is associated with one of the contacts.

In one implementation, leader IoT device 110-1 may communicate with cloud server 140 and/or another backend server (e.g., a device within an LTE network associated with cloud platform 103). For example, leader IoT device 110-1 may receive a connection request from another IoT device 110-2, and leader IoT device 110-1 may forward information included in the request, such as an identifier, location, function, serial number, etc., of requesting IoT device 110-2, to cloud server 140. Cloud server 140 may use the information received from leader IoT device 110-1 to determine whether requesting IoT device 110-2 should be admitted into local area cloud 101. For example, cloud server 140 may use the received information to identify requesting IoT device 110-2 and/or an associated user, and cloud server 140 may determine whether requesting IoT device 110-2 is a friend.

In certain implementations, cloud server 140 may dynamically calculate a "friendship" score for the requesting IoT device 110-2. For example, cloud server 140 may identify an owner associated with requesting IoT device 110-2, and cloud server 140 may calculate the friendship score with respect to the identified owner based on various factors such as: (1) whether the owner of requesting IoT device 110-2 is known to or identified as a friend (or even a close friend) of an owner associated with leader IoT device 110-1; (2) whether the identified owner of requesting IoT device 110-2 is known or identified as a friend of another person identified as a friend of the owner of leader IoT device 110-1; (3) whether one or more other IoT devices 110 of the identified owner of requesting IoT device 110-2 has been admitted into local area cloud 101 associated with leader IoT device 110-1 or another local area cloud 101; (4) whether requesting IoT device 110-2 or an associated owner is approved by a third party, such as a government official, a third-party verification service, other IoT devices 110 in local area cloud 101, or other leader IoT devices 110 communicating the cloud server 140; etc. If the friendship score is higher than a threshold value, IoT device 110 may be admitted into local area cloud 101. In another example, leader IoT device 110 may determine to admit another IoT device 110 into local area group when an associated owner is approved by a third party, such as a government official or a third-party verification service.

Each IoT device 110 may be associated with an owner (or user). In some situations, IoT device 110 in local area cloud 101 may be associated with a same user and/or a related group of users. For example, IoT devices 110 belonging to a user may form local area cloud 101 at the user's residence, vehicle, work place, etc. In another example, various IoT devices 110 associated with a user, such as wearable devices (e.g., a fitness tracker, smart glasses, smart watch, headphones, etc.) and a smartphone, may form local area cloud 101 at the user's location. In these examples, other IoT devices 110 associated with other users may be excluded from local area cloud 101.

In other examples, IoT device 110 in local area cloud 101 may be associated with different users. For example, IoT devices 110 associated with different users and located at a common geographic location and/or in physical proximity (e.g., within range of Wifi and/or Bluetooth® communications) may coordinate to form local area cloud 101. For instance, IoT devices 110 associated with different users and positioned at a public venue may coordinate to capture and distribute images of an event (e.g., so that cloud server 140 causes images captured by IoT devices 110 positioned closest to the event to be distributed to other IoT devices 110 in local area cloud 101). In this example, other IoT devices 110 that are associated with different users, but located at a different geographic position may be excluded from local area cloud 101. In another example, IoT devices 110 associated with a common function or group of functions may combine to form local area cloud 101 while other IoT devices 110 associated with different functions may be excluded from local area cloud 101. For instances, IoT devices 110 associated with monitoring and controlling environmental functions in a building may combine to form local area cloud 101 while IoT devices 110 (e.g., an entertainment devices) associated with performing other functions may be excluded from local area cloud 101.

IoT device 110 may be associated with different cloud servers 140 (e.g., for performing associated functions) and/or different application devices 150 (e.g., associated with different owners). In operation, a leader IoT device 110 may exchange communications with cloud servers 140, and the communications may include instructions for controlling IoT devices 110 in local area cloud 101.

Each of IoT devices 110 may also have some freedom to make some local decisions based on the instructions received from cloud servers 140. For example, cloud server 140 may forward decision rules for selecting a leader from among IoT devices 110 within local area cloud 101, but IoT devices 110 may implement the decision rules to select a leader. When an IoT device 110 operating as the leader (IoT device 110-1 in FIG. 1B) is dropped from or otherwise leaves local area cloud 101, then another one of the IoT devices 110 within local area cloud 101 may be selected as the leader based on the rules received from cloud server 140. For example, cloud server 140 may forward an ordered list of IoT devices 110, and a new leader may be selected based on the list (e.g., a next IoT device 110 identified in the list is selected to assume the role of leader). Additionally or alternatively, cloud server 140 may forward selection criteria that may be used to identify the leader. For example, IoT device 110 closest to base station 130 or otherwise receiving the strongest signals from base station 130 may be selected as the leader.

As previously described, IoT device 110, when functioning as the leader, may perform certain functions related to admitting new IoT devices 110 into local area cloud 101. For example, the leader IoT device 110 may function to coordinate the activities in local area cloud 101 and/or to perform initial identification and verification of IoT device 110 requesting to join local area cloud 101.

In one implementation, each IoT device 110 in local area cloud 101 may separately verify other IoT devices 110. For example, an IoT device 110 that does not operate as a leader (e.g., IoT device 110-2) may verify that another IoT device 110-3 is eligible to join local area cloud 101. If non-leader IoT device 110-2 determines that other IoT device 110-3 is not eligible to join local area cloud 101 (e.g., IoT device 110-3 does not provide valid credentials, is not a correct IoT device type, etc.), non-leader IoT device 110-2 may forward a warning message to leader IoT device 110-1. Additionally or alternatively, non-leader IoT device 110-2 may leave local area cloud 101 based on determining that one or more other IoT devices 110 should not have been admitted into local area cloud 101. For example, IoT device 110-2 may form a separate local area cloud 101 based on determining that a local area cloud 101 is not secure or includes IoT devices 101 that may be incompatible with IoT device 110-2.

IoT devices 110 that are joined through local area cloud 101 (e.g., using WiFi) may perform certain actions together in a coordinated way. For example, IoT devices 110 may emit an audio output (e.g., a beep) at the same time during emergency, may take different angle video/pictures in a surrounding area, designate one of the IoT devices 110 as a leader that communicates with base station 130 to access cloud platform 103 to exchange data for performing various functions. For example, if one IoT device 110 corresponds to a video camera and another IoT device 110 corresponds to a wireless hotspot (e.g., a device for providing Internet access using WiFi or other wireless local area network (WLAN) standard), the hotspot IoT device 110 will be responsible for transporting streaming content captured by the video camera IoT device 110 to cloud platform 103.

In one implementation, leader IoT device 110-1 and cloud server 140 may exchange public encryption keys. For example, certain messages (e.g., messages regarding admission of requesting IoT device 110-2 into local area cloud 101) sent from leader IoT device 110-1 may be encrypted using a public key associated with a particular cloud server 140, and certain messages (e.g., message regarding admission decisions) sent from the particular cloud server 140 may be encrypted using a public or private key associated with leader IoT device 110-1.

An example of admissions control by leader IoT device 110-1 is now described with respect to a local area cloud 101 in a private residence. Leader IoT device 110-1 (e.g., a smartphone device) may be associated with an owner (or occupant) of the residence. Other IoT devices 110 may be associated with the same owner and may register with leader IoT device 110-1 using an identifier associated with the owner (e.g., an IoT device may register with a leader IoT device 110-A using a owner code). For example, IoT devices 110 associated with door locks, lighting controls, garage door openers, heating/cooling controls, moisture sensors, window openers, movement sensors, security cameras, oven controllers, etc., may be controlled through a single leader IoT device 110 associated with the owner. For example, IoT devices 110 may be programmed so that a message associated with opening a door lock or a garage door in the residence is forwarded to the leader IoT device 110-1, and leader IoT device 110-1 prompts other IoT devices 110 to perform certain actions, such as activating lights, activating a security camera, modifying an ambient temperature, opening other doors/looks within the home, etc. In another example, when outside moisture is detected (e.g., rain is detected) windows, doors, garage doors, etc., may be automatically closed, environmental controls may be modified to change internal temperature, etc.

In local area cloud 101 associated with a residence, other IoT devices 110 that are not associated with the owner of the residence may also attempt to join local area cloud 101. For example, other IoT devices 110 may be owned by a visitor. An owner of the residence may submit an input (e.g., via application device 150) identifying an authorized third-party, such as invited guests, and leader IoT device 110-1 may admit devices associated with the authorized third-party. When leader IoT device 110-1 receives an access request from a requesting IoT device 110, leader IoT device 110-1 may interact with cloud server 140 to determine if requesting IoT device 110-2 is associated with an authorized third-party. If requesting IoT device 110-2 is associated with an invited guest, leader IoT device 110-1 for forward credentials (e.g., a WiFi passcode) that enables requesting IoT device 110-2 to access local area cloud 101. If requesting IoT device 110-2 is not associated with an authorized third-party, leader IoT device 110-1 may forward a message denying access to local area cloud, requesting additional login data, and/or forwarding credential that enable the requesting IoT device 110-2 to have limited access to local area cloud 101 (e.g., to forward a request for assistance, receive certain types of data, etc.).

As shown in FIG. 1C, environment 100-C may include cloud platform 103 that couples cloud servers 140 (shown in FIG. 1C as cloud server 140-1 through 140-Y) to multiple local area clouds 101 (shown in FIG. 1C as local cloud areas 101-1 through 101-X) and multiple application devices 150 (shown in FIG. 1C as application devices 150-1 through 150-Z). For example, local area clouds 101 may be associated with groups of IoT devices 110 at different geographic locations, cloud servers 140 may be associated with different functions and/or types of IoT devices 110, and application devices 150 may be associated with different users. As previously described, cloud platform 103 may configure paths that provide a faster, more reliable, more secure, etc. communications between cloud server 140 and local area cloud 101 that includes actuator IoT devices 110 and a less secure, potentially slower paths between cloud server 140 and local area cloud 101 that includes only sensor-IoT devices 110.

For example, cloud platform 103 may store data identifying a user, function(s), and local area cloud 101 associated with each different IoT device 110. For example, when a message is received from a local area cloud 101, cloud platform 103 may identify a particular IoT device 110 within local area cloud 101 that is associated with the message, cloud server 140 associated with a function performed by the particular IoT device 110, and an application device 150 associated with a user of the particular IoT device 110. For example, if the received message relates to sensor reading collected by the particular IoT device 110 and/or relevant sensor readings from another IoT device 110 in the same local area cloud 101, cloud platform 103 may forward the message to cloud server 140 associated with the particular IoT device 110 to determine an appropriate action, as determined based on an input from an associated application device 150. Cloud server 140 may then identify, based on the received sensor data, an appropriate action to be performed by an actuator IoT device 110, and may forward instructions to direct the actuator IoT device 110 to perform the identified action. Cloud platform 103 may identify a local area cloud 101 associated with the actuator IoT device 110 and forward the instruction to a leader of the identified local area cloud 101.

The number of devices and/or networks, illustrated in FIGS. 1A-1C, is provided for explanatory purposes only. In practice, environment 100 may include additional devices and/or networks, fewer devices and/or networks, different devices and/or networks, or differently arranged devices and/or networks than those illustrated in FIGS. 1A-1C. Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

As shown in FIG. 2, cloud platform 103 may include a core network 201 that controls sessions between IoT device 110 (e.g., through IoT modem 120) and cloud server 140 and/or application device 150. For example, core network 201 may include a serving gateway (SGW) 210, a mobility management entity device (MME) 220, service enforcement server (SES) 230, a packet data network (PDN) gateway (PGW) 240, and a policy and charging rules function (PCRF) 250 that combine to enable and control access to cloud servers 140 and/or application device 150 (e.g., via a data network 260).

SGW 210 may include one or more network devices, such as a gateway, a router, a modem, a switch, a firewall, a network interface card (NIC), a hub, a bridge, a proxy server, an optical add-drop multiplexer (OADM), or another type of device that processes and/or transfers traffic. SGW 210 may, for example, aggregate traffic received from one or more base stations 130 and may send the aggregated traffic to cloud server 140 and/or application device 150 via PGW 240. In one example implementation, SGW 210 may route and forward user data packets, may act as a mobility anchor for a user plane during inter-eNB handovers, and may act as an anchor for mobility between LTE and 3GPP or other technologies.

MME 220 may include one or more network devices that perform operations associated with a handoff to and/or from core network 201. MME 220 may perform operations to register IoT devices 110 with core network 201 to handoff IoT device 110 (e.g., a leader IoT device 110) from core network 201 to another network, to handoff IoT device 110 from the other network to core network 201 and/or to perform other operations. MME 220 may perform policing operations for traffic destined for and/or received from IoT device 110. MME 220 may also authenticate IoT device 110 (e.g., via interaction with PCRF 250) to establish the session between IoT device 110 and cloud server 140 and/or application device 150. For example, MME 220 may authenticate IoT device 110 and/or another IoT device 110 within an associated local area cloud 101.

SES 230 may identify user profiles as provided by PCRF 250 to PGW 240 and may forward information regarding these user profiles to cloud servers 140. For example, SES 230 may identify, IoT device 110 associated with session and may access, via PCRF 250, a profile associated with IoT device 110 to identify cloud server 140 and/or application device 150 associated with IoT device 110. SES 230 may further identify the identified cloud server 140 and/or application device 150 to PGW 240 to form the session with IoT device 110, so that communications from IoT device 110 are directed to a correct cloud server 140 and/or application device 150.

PGW 240 may include one or more network devices, such as a gateway, a router, a modem, a switch, a firewall, a NIC, a hub, a bridge, a proxy server, an optical add/drop multiplexor (OADM), or another type of device that processes and/or transfers traffic. PGW 240 may, for example, provide connectivity of IoT device 110 to data network 260 by serving as a traffic exit/entry point for IoT device 110. PGW 240 may perform policy enforcement, packet filtering, charging support, lawful intercept, and/or packet screening. PGW 240 may also act as an anchor for mobility between 3GPP and non-3GPP technologies.

PCRF 250 may include one or more devices that provide policy control decisions and flow based charging control functionalities. PCRF 250 may provide network control regarding service data flow detection, gating, quality of service (QoS) and flow based charging, etc. PCRF 250 may determine how a certain service data flow shall be treated, and may ensure that user plane traffic mapping and treatment are in accordance with a user's subscription profile. For example, PCRF 250 may identify and apply a user profile related to IoT device 110 when transmitting a message to cloud server 140 and/or application device 150.

Data network 260 may include one or more wired and/or wireless networks. For example, data network 260 may include the Internet, a public land mobile network (PLMN), and/or another network. Additionally, or alternatively, data network 260 may include a local area network (LAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

In one implementation, a component (e.g., SGW 210) of core network 201 may receive, from a first (e.g., leader) IoT device 110, a notification that a second IoT device 110 has joined a local area cloud 101 and other information regarding a status of second IoT device 110. A component of core network 201 (e.g., MME 220 and/or SES 230) may parse the received message to identify first and second IoT devices 110. A component of core network 201 (e.g., PCRF 250) may store data associating the first and second IoT devices 110 with a local area cloud 101 and further register first IoT device 110 to communicate via core network 201 with cloud platform 203. PCRF 250 may maintain data associating first and second IoT devices 110 with local area cloud 101 and identify first IoT device 110 as a leader of local area cloud 101. PCRF 250 and/or another component of core network 201 may identify one or more cloud servers 140 to receive the notification. For example, PCRF 250 may identify cloud server 140 associated with a device type and/or a function associated with the second IoT device 110. SES 230 may then direct PGW 240 to establish a session to forward the status notification to identified cloud server 140.

Subsequently, when an instruction for the second IoT device 110 is received from the identified cloud server 140, PCRF 250 may determine (e.g., based on the stored data) that second IoT device 110 is included in local area cloud 101 that is lead by first IoT device 110. Attributes of the sessions (e.g., security, bandwidth, latency, dropped packet rate, jitter, etc.) may be modified based on stored profiles of the first and second IoT devices 110. For example, if second IoT device 110 is an actuator (e.g., performs a function to modify a physical environment), SES 230 may direct PGW 240 to form a session (e.g., route the associated data through certain nodes) to have higher bandwidth, more security, less latency, lower packet drop rate, etc. SES 230 may then establish another session with first IoT device 110 to forward the instruction, and first IoT device 110 may distribute the instruction to second IoT device 110 through local area cloud 101.

The number of devices and/or networks, illustrated in FIG. 2, is provided for explanatory purposes only. In practice, cloud platform 103 may include additional devices and/or networks, fewer devices and/or networks, different devices and/or networks, or differently arranged devices and/or networks than those illustrated in FIG. 2. Also, in some implementations, one or more of the devices of cloud platform 103 may perform one or more functions described as being performed by another one or more of the devices of cloud platform 103. Devices of cloud platform 103 may interconnect via wired connections, wireless connections, or a combination of wired and wireless connections.

Figure 3:
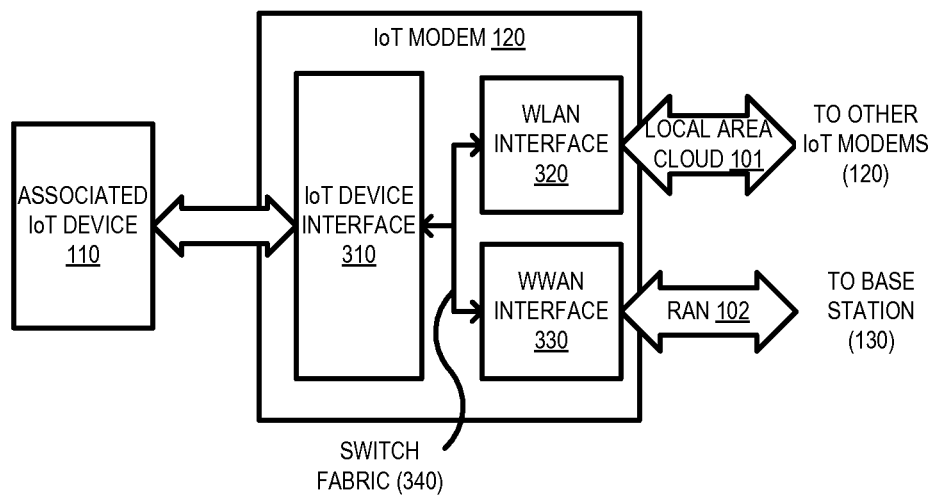
FIG. 3 shows exemplary components of an IoT modem that may be included in the environment shown in FIGS. 1A-1C.

FIG. 3 is a diagram illustrating exemplary components of IoT modem 120. As shown in FIG. 3, IoT modem 120 may include an IoT device interface 310, a WLAN interface 320, a WWAN interface 330, and a switch fabric 340. As described above, in some instances, IoT modem 120 may be included within IoT device 110.

IoT device interface 310 may couple IoT modem 120 to an associated IoT device 110. For example, IoT device interface 310 may exchange data between the associated IoT device 110 and IoT modem 120. IoT device interface 310 may include a physical connector that receives and accepts a wire, cable, or other data pathway for carrying data and/or a wireless interface for receiving the data. IoT device interface 310 may also include a buffer for storing received data for processing and transmission. In one implementation, IoT device interface 310 may include a universal serial bus (USB) or other data port that allows data and/or instructions to be sent between the associated IoT device 110 and IoT modem 120.

In some embodiments, IoT modem 120 may include an radio-frequency (RF) transceiver. For example, IoT modem 120 may include WLAN interface 320 to exchange transmissions in a frequency spectrum used for WLAN communications (e.g., to communicate with other IoT modems 120 in local area cloud 101). WLAN interface 320 may further include logic for joining local area cloud 101, such as to transmit a request to join local area cloud 101 or to forward instructions/data to other IoT modems 120.

As shown in FIG. 3, IoT modem 120 may also include WWAN interface 330. WWAN interface 330 may exchange transmissions in a frequency spectrum used for WWAN communications (e.g., for LTE communications with base station 130). WWAN interface 330 may further include logic for communicating with base station 130, such as to transmit a status message to base station 130.

Switch fabric 340 may include one or more physical links and one or more switching planes to facilitate communication between IoT device interface 310, WLAN interface 320, and WWAN interface 330. In one implementation, the switching planes may include crossbar or other types of switching elements.

The number of components illustrated in FIG. 3 is provided for explanatory purposes only. In practice, IoT modem 120 may include additional components, fewer components, different components, or differently arranged components than those illustrated in FIG. 3. Also, in some implementations, one or more of components of IoT modem 120 may perform one or more functions described as being performed by another component of IoT modem 120. Components of IoT modem 120 may be interconnected via wired connections, wireless connections, or a combination of wired and wireless connections.

Figure 4:
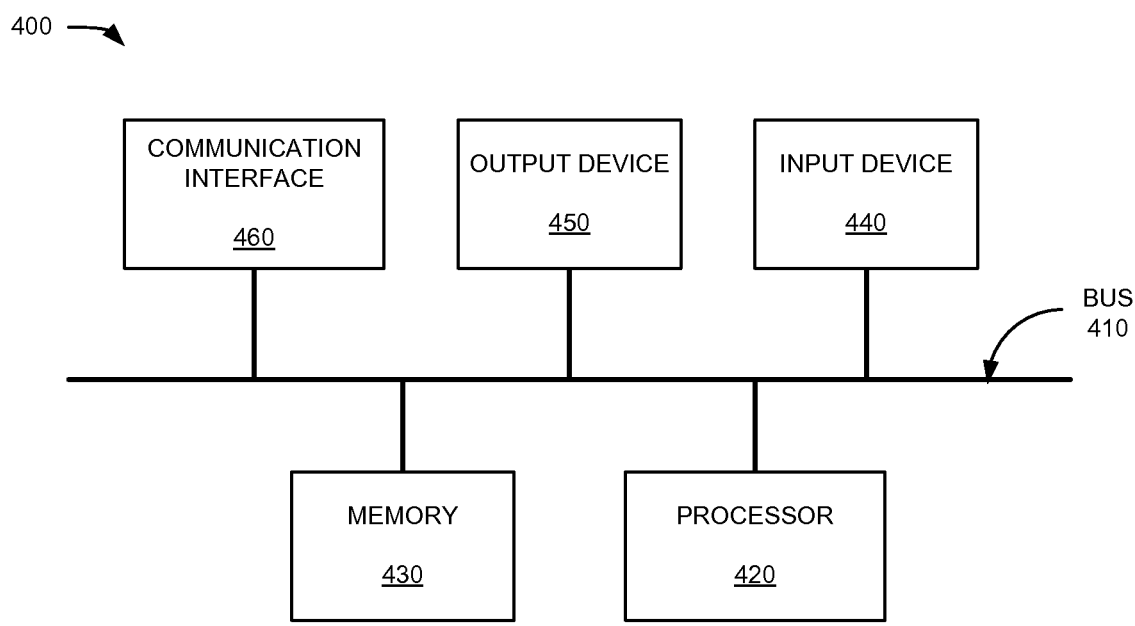
FIG. 4 shows a diagram of exemplary components that may be included in a computing device included in the environment shown in FIGS. 1A-1C.

FIG. 4 is a diagram illustrating exemplary components of a computing device 400. IoT device 110, base station 130, cloud server 140, application device 150, SGW 210, MME 220, SES 230, PGW 240, and/or PCRF 250 may include one or more devices 400 and/or one or more components of computing device 400. As shown in FIG. 4, computing device 400 may include a bus 410, a processor 420, a memory 430, an input device 440, an output device 450, and a communication interface 460.

Bus 410 may include a path that permits communication among the components of computing device 400. Processor 420 may include a processor, a microprocessor, or processing logic that may interpret and execute instructions. Memory 430 may include any type of dynamic storage device that may store information and instructions, for execution by processor 420, and/or any type of non-volatile storage device that may store information for use by processor 420.

Input device 440 may include a mechanism that permits a user to input information to computing device 400, such as a keyboard, a keypad, a button, a switch, etc. Output device 450 may include a mechanism that outputs information to the user, such as a display (e.g., a liquid crystal display), a speaker, one or more light emitting diodes (LEDs), etc. Communication interface 460 may include a transceiver mechanism that enables computing device 400 to communicate with other devices and/or systems via wireless communications, wired communications, or a combination of wireless and wired communications. For example, communication interface 460 may include mechanisms for communicating with another device or system via a network. Alternatively or additionally, communication interface 460 may be a logical component that includes input and output ports, input and output systems, and/or other input and output components that facilitate the transmission of data to other devices.

Computing device 400 may perform certain operations in response to processor 420 executing software instructions contained in a computer-readable medium, such as memory 430. A computer-readable medium may be defined as a non-transitory memory device. A memory device may include space within a single physical memory device or spread across multiple physical memory devices. The software instructions may be read into memory 430 from another computer-readable medium or from another device. The software instructions contained in memory 430 may cause processor 420 to perform processes described herein. Alternatively, hardwired circuitry may be used in place of or in combination with software instructions to implement processes described herein. Thus, implementations described herein are not limited to any specific combination of hardware circuitry and software.

FIG. 4 shows exemplary components of computing device 400. In other implementations, computing device 400 may contain fewer components, additional components, different components, or differently arranged components than those depicted in FIG. 4. For example, computing device 400 may include one or more switch fabrics instead of, or in addition to, bus 410. In another example, in some implementations, a display may not be included in computing device 400, and in these situations, computing device 400 may be a "headless" device that does not include input device 440. Additionally or alternatively, one or more operations described as being performed by a particular component of computing device 400 may be performed by one or more other components, in addition to or instead of the particular component of computing device 400.

Figure 5:
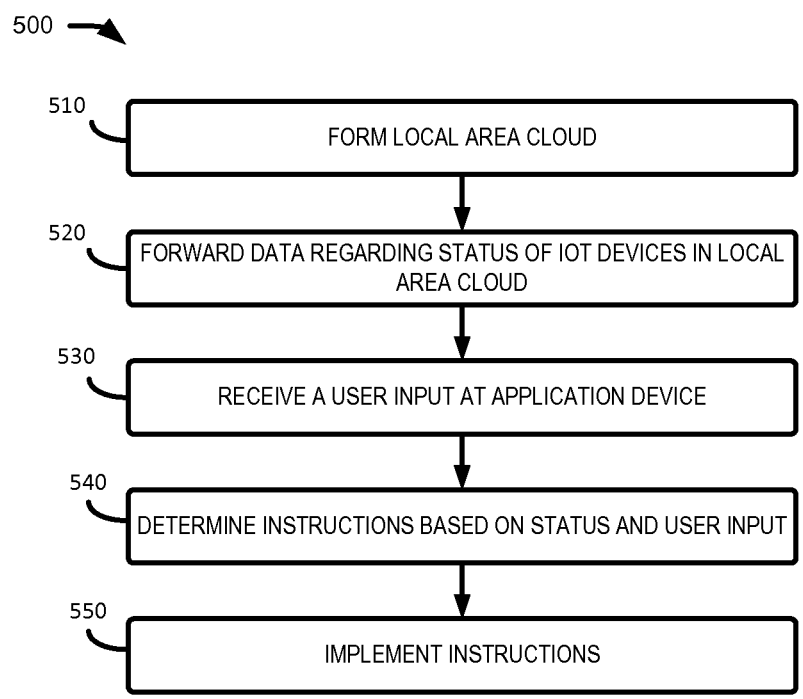
FIG. 5 is a flow diagram illustrating an exemplary process for controlling an IoT device in the environment shown in FIGS. 1A-1C.

FIG. 5 is a flow diagram illustrating an exemplary process 500 for controlling one or more IoT devices 110. In one implementation, process 500 may be performed by IoT device 110, IoT modem 120 and/or one or more other components of cloud platform 103 (e.g., core network 201, cloud server 140 and/or application device 150). In other implementations, process 500 may be performed by one or more other devices of environment 100.

As shown in FIG. 5, process 500 may include forming a local area cloud 101 (block 510). For example, as described above with respect to FIG. 1B, an IoT device 110 when activated and/or entering an area may search for and attempt to join an existing local area cloud 101. For example, IoT device 110 may forward a request to join a discovered local area cloud 101, and a leader (e.g., another IoT device 110) may determine whether to admit the requesting IoT device 110. For instance, the leader IoT device 110 may receive admission criteria from cloud server 140 and may determine whether to admit the requesting IoT device 110 based on the received admission criteria. If IoT device 110 does not discover local area cloud 101, IoT device 110 may initiate a new local area cloud 101.

As shown in FIG. 5, process 500 may further include forwarding data regarding the status of the IoT device(s) 110 in local area cloud 101 (block 520). For example, leader IoT device 110 may forward a notification to cloud server 140 and/or application device 150 when IoT device 110 is admitted into and/or leaves local area cloud 101 or when a new local area cloud 101 is initiated. The notification may include an identifier (e.g., an address associated with the leader IoT device 110) for local area cloud 101 and an identifier (e.g., a serial number or other unique identifier) for the IoT device 110 joining or leaving local area cloud 101. Additionally or alternatively, leader IoT device 110 may receive and forward sensor or other data received from other IoT devices 110 included in local area cloud 101. In one implementation, cloud server 140 may forward criteria for sending a status update, and leader IoT device 110 may forward status data when one or more of the criteria are satisfied.

Continuing with FIG. 5, process 500 may also include receiving a user input at application device 150 (block 530) and determining instructions based on the status of the IoT devices 110 and the user input received by application device 150 (block 540). For example, the user input to application device 150 may specify one or more action selection criteria, and cloud server 140 may select an action to perform based on the received status information in view of the specified selection criteria. In block 540, cloud server 140 may forward the instructions to local area cloud 101, and an associated leader IoT device 110 may distribute the instructions to appropriate IoT devices 110. IoT devices 110 may then implement the instructions (block 550).

For example, if local area cloud 101 relates to a group of IoT devices 110 for capturing images of an event, the instructions may direct IoT devices 110 closest to the event to capture images and to share the captured images with other IoT devices 110 within local area cloud 101. Leader IoT device 110 may identify, based on the status message, the closest IoT devices 110 and forward instructions to cause the identified IoT device 110 to capture the images of the event and to forward the images to leader IoT device 110. Leader IoT device 110 may then distribute the captured images to the other IoT devices within local area cloud 101.

Various preferred embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 5, the order of the blocks in process 500 may be modified in other implementations. Furthermore, non-dependent blocks may be performed in parallel. Furthermore, process 500 may include additional and/or fewer blocks than shown in FIG. 5.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

What is claimed is:

1. A method comprising:
   identifying, by one or more processors, a status of a first Internet of Things (IoT) device included in a local area cloud of a plurality of IoT devices that are connected in a geographic area via a wireless local area network (WLAN), wherein a second IoT device of the plurality of IoT devices, as a leader of the local area cloud, communicates to a plurality of server devices on behalf of the local area cloud via a base station of a radio access network serving the geographic area;

identifying, by the one or more processors, a server device associated with the first IoT device;

transmitting, by the one or more processors, via a first type of communication path, a first type of sensor data obtained from the first IoT device to the server device for selection of a first type of physical action to be performed by the first IoT device;

forwarding, by the one or more processors, information identifying the status to the server device via a wireless wide area network (WWAN);

determining, by the one or more processors, that the second IoT device is no longer included in the local area cloud;

forwarding, by the one or more processors, a set of rules that define leader selection as a function of a relative signal strength and a geographic distance with respect to the base station;

evaluating, by one or more of the plurality of IoT devices, the plurality of IoT devices against the set of rules to determine a third IoT device associated with a superior signal strength and a shortest geographic distance;

implementing, by the one or more of the plurality of IoT devices, a selection of the third IoT device as the leader of the local area cloud;

receiving, by the one or more processors, data identifying the first type of physical action; and forwarding, by the one or more processors and via a second type of communication path, the data identifying the first type of physical action to the third IoT device for distribution to the first IoT device via the local area cloud, wherein, based on the first type of sensor data and a time-sensitivity of the first type of physical action, a first security protocol, a first level of reliability, a first transmission speed, a first bandwidth amount, a first number of trusted nodes, and a first level of priority path associated with the first type of communication path differ from a second security protocol, a second level of reliability, a second transmission speed, a second bandwidth amount, a second number of trusted nodes, and a second level of priority path associated with the second type of communication path.

2. The method of claim 1, wherein the server device includes a configuration file that identifies a plurality of physical actions and selection criteria for selecting from among the plurality of physical actions and a policy engine to select the physical action from the plurality of physical actions based on the configuration file, and wherein the method further comprises:

receiving, from a user device associated with an owner of the first IoT device, a message to modify the configuration file; and forwarding the message to the server device, wherein the server device modifies the configuration file based on the message and wherein the policy engine selects the first type of physical action based on the modified configuration file.

3. The method of claim 1, wherein the server device further selects a second type of physical action to be performed by a fourth IoT device of the plurality of IoT devices included in the local area cloud, wherein the data further identifies the second type of physical action, and wherein the third IoT device forwards the data to the fourth IoT device via the local area cloud.

4. The method of claim 1, wherein the local area cloud is a first local area cloud, and wherein the method further includes:

identifying a status of one or more IoT devices included in a second local area cloud; and forwarding data identifying the status of the one or more IoT devices to the server device, wherein the server device identifies the first type of physical action further based on the identified status of the one or more IoT devices.

5. The method of claim 1, wherein the plurality of IoT devices are coupled to a plurality of IoT modems, wherein the plurality of IoT modems communicate with each other using a WLAN protocol, and wherein one of the plurality of IoT modems is coupled to the third IoT device and communicates with the server device using a WWAN protocol.

6. The method of claim 1, wherein the status relates to a request by a fourth IoT device to join the local area cloud, and wherein the method further includes:

calculating a score for the fourth IoT device, wherein the score is calculated based on:
whether an owner of the fourth IoT device is known to an owner of the third IoT device,
whether the owner of the fourth IoT device is known to an owner of another one of the plurality of IoT devices included in the local area cloud,
whether the owner of the fourth IoT device is an owner of one of the plurality of IoT devices included in the local area cloud, and
whether the owner of the fourth IoT device is approved by a trusted third party; and determining to admit the fourth IoT device into the local area cloud when the score is greater than a threshold value.

7. The method of claim 1, wherein the information regarding the status of the first IoT device includes 256 or fewer bytes of data,
wherein the first type of sensor data is personal health information,
wherein the first type of physical action does not correspond to performing a time-sensitive function,
wherein the first security protocol corresponds to a level of security that is higher than a level of security corresponding to the second security protocol, and
wherein the first level of priority path corresponds to a higher level of priority than a level of priority corresponding to the second level of priority path.

8. A system comprising:
a plurality of Internet of Things (IoT) devices in a local area cloud, and
a first server device comprising:
a wireless local area network (WLAN) communication interface;
a wireless wide area network (WWAN) communication interface;
a memory to store instructions; and
a processor configured to execute the instructions to:
receive, via the WWAN communication interface, information regarding a status of a first IoT device of the plurality of IoT devices that connect to a base station over a radio access network, wherein a second IoT device of the plurality of IoT devices functions as a leader of the local area cloud, wherein the first server device is selected from a plurality of server devices based on the first IoT device;

transmit, via a first type of communication path, a first type of sensor data obtained from the first IoT device to the first server device;

determine that the second IoT device is no longer included in the local area cloud;

forward, via the WLAN communication interface, a set of rules that define leader selection as a function of relative signal strength and a geographic distance with respect to the base station, wherein one or more of the plurality of IoT devices evaluate the plurality of IoT devices against the set of rules to determine a third IoT device associated with a superior relative signal strength and a shortest geographic distance, and implement a selection of the third IoT device as the leader of the local area cloud;

select, based on the first type of sensor data, a first type of physical action to be performed by the first IoT device; and forward, via a second type of communication path, data identifying the first type of physical action to the third IoT device for distribution to the first IoT device via the local area cloud, wherein, based on the first type of sensor data and a time-sensitivity of the first type of physical action, a first security protocol, a first level of reliability, a first transmission speed, a first bandwidth amount, a first number of trusted nodes, and a first level of priority path associated with the first type of communication path differ from a second security protocol, a second level of reliability, a second transmission speed, a second bandwidth amount, a second number of trusted nodes, and a second level of priority path associated with the second type of communication path.

9. The system of claim 8, wherein the processor is further configured to:
store a configuration file that identifies a plurality of physical actions and selection criteria for selecting from among the plurality of physical actions;
receive, from a user device associated with an owner of the first IoT device, a message that relates to modifying the configuration file;
modify the configuration file based on the message; and
select the first type of physical action from the plurality of physical actions based on the modified configuration file.

10. The system of claim 8, wherein the processor is further configured to:
select a second type of physical action to be performed by a fourth IoT device of the plurality of IoT devices included in the local area cloud, wherein the data further identifies the second type of physical action, and wherein the third IoT device forwards the data to the fourth IoT device via the local area cloud.

11. The system of claim 8, wherein the local area cloud is a first local area cloud, and wherein the processor is further configured to:
determine a status of one or more IoT devices included in a second local area cloud, wherein the processor is configured to identify the first type of physical action further based on the status of the one or more IoT devices.

12. The system of claim 8, wherein the plurality of IoT devices are coupled to a plurality of IoT modems, wherein the plurality of IoT modems communicate with each other using a WLAN protocol, and wherein one of the plurality of IoT modems is coupled to the third IoT device and communicates with the first server device using a WWAN protocol.

13. The system of claim 8, wherein the status relates to a request by a fourth IoT device to join the local area cloud, and wherein the processor is further configured to:
calculate a score for the fourth IoT device, wherein the score is calculated based on:
whether an owner of the fourth IoT device is known to an owner of the third IoT device,
whether the owner of the fourth IoT device is known to an owner of another one of the plurality of IoT devices included in the local area cloud,
whether the owner of the fourth IoT device also is an owner of one of the plurality of IoT devices included in the local area cloud, and
whether the owner of the fourth IoT device is approved by a trusted third party; and
determine to admit the fourth IoT device into the local area cloud when the score is greater than a threshold.

14. The system of claim 8, wherein the information regarding the status of the first IoT device includes 256 or fewer bytes of data,
wherein the first type of sensor data is something other than personal health information,
wherein the first type of physical action corresponds to performing a time-sensitive function,
wherein the first security protocol corresponds to a level of security that is lower than a level of security corresponding to the second security protocol, and
wherein the first level of priority path corresponds to a lower level of priority than a level of priority corresponding to the second level of priority path.

15. A non-transitory computer-readable medium to store instructions, the instructions comprising:
instructions that when executed by a processor, cause the processor to:
receive, via a wireless wide area network (WWAN) interface, information regarding a status of a first Internet of Things (IoT) device of a plurality of IoT devices that form a local area cloud and connect to a base station via a radio access network, wherein a second IoT device of the plurality of IoT devices functions as a leader of the local area cloud;
transmit, via a first type of communication path, a first type of sensor data obtained from the first IoT device to a first server device;
forward a set of rules that define leader selection as a function of relative signal strength and a geographic distance with respect to the base station, wherein one or more of the plurality of IoT devices evaluate the plurality of IoT devices against the set of rules to determine a third IoT device associated with a superior relative signal strength and a shortest geographic distance, and implement a selection of the third IoT device as the leader of the local area cloud;
select, based on the first type of sensor data, a first type of physical action to be performed by the first IoT device; and
forward, via a second type of communication path, data identifying the first type of physical action to the third IoT device for distribution, via a wireless wide area network (WWAN) interface, to the first IoT device via the local area cloud, wherein, based on the first type of sensor data and a time-sensitivity of the first type of physical action, a first security protocol, a first level of reliability, a first transmission speed, a first bandwidth amount, a first number of trusted nodes, and a first level of priority path associated with the first type of communication path differ from a second security protocol, a second level of reliability, a second transmission speed, a second bandwidth amount, a second number of trusted nodes, and a second level of priority path associated with the second type of communication path.

16. The non-transitory computer-readable medium of claim 15, wherein the first server device includes a configuration file that identifies a plurality of physical actions and selection criteria for selecting from among the plurality of physical actions, and wherein the instructions further cause the processor, when selecting the first type of physical action, to:
receive, from a user device associated with an owner of the first IoT device, a message that relates to modifying the configuration file;
modify the configuration file based on the message; and
select the first type physical action from the plurality of physical actions based on the modified configuration file.

17. The non-transitory computer-readable medium of claim 15, wherein the instructions further cause the processor to:
select a second type of physical action to be performed by a fourth IoT device of the plurality of IoT devices included in the local area cloud; and
include, in the data, an indication of the second type of physical action, wherein the third IoT device forwards the data to the fourth IoT device via the local area cloud.

18. The non-transitory computer-readable medium of claim 15, wherein the local area cloud is a first local area cloud, and wherein the instructions further cause the processor to:
determine a status of one or more IoT devices included in a second local area cloud; and
identify the first type of physical action further based on the status of the one or more IoT devices.

19. The non-transitory computer-readable medium of claim 15, wherein the plurality of IoT devices are coupled to a plurality of IoT modems, wherein the plurality of IoT modems communicate with each other using a WLAN protocol, and wherein one of the plurality of IoT modems is coupled to the third IoT device and communicates with the first server device using a WWAN protocol.

20. The non-transitory computer-readable medium of claim 15, wherein the status relates to a request by a fourth IoT device to join the local area cloud, and wherein the instructions further cause the processor to:
calculate a score for the fourth IoT device, wherein the score is calculated based on:
whether an owner of the fourth IoT device is known to an owner of the third IoT device,
whether the owner of the fourth IoT device is known to an owner of another one of the plurality of IoT devices included in the local area cloud,
whether the owner of the fourth IoT device also is an owner of one of the plurality of IoT devices included in the local area cloud, and
whether the owner of the fourth IoT device is approved by a trusted third party; and
determine to admit the fourth IoT device into the local area cloud when the score is greater than a threshold.

* * * * *